United States Patent
Sumi

(10) Patent No.: US 7,453,535 B2
(45) Date of Patent: Nov. 18, 2008

(54) LIQUID CRYSTAL DISPLAY DEVICE HAVING UPPER SUBSTRATE LIGHT SHIELD SUPERPOSING GATE AND SOURCE WIRING WITH CUTS NEAR GATE AND SOURCE TERMINAL PARTS

(75) Inventor: Akinori Sumi, Kumamoto (JP)

(73) Assignee: Mitsubishi Denki Kabushiki Kaisha, Chiyoda-Ku, Tokyo (JP)

( * ) Notice: Subject to any disclaimer, the term of this patent is extended or adjusted under 35 U.S.C. 154(b) by 364 days.

(21) Appl. No.: 11/115,283

(22) Filed: Apr. 27, 2005

(65) Prior Publication Data

US 2005/0243236 A1 Nov. 3, 2005

(30) Foreign Application Priority Data

Apr. 30, 2004 (JP) ............................. 2004-135424

(51) Int. Cl.
*G02F 1/1333* (2006.01)
(52) U.S. Cl. ..................................................... 349/110
(58) Field of Classification Search .................. 349/110
See application file for complete search history.

(56) References Cited

U.S. PATENT DOCUMENTS

| | | | | |
|---|---|---|---|---|
| 5,128,786 A | * | 7/1992 | Yanagisawa | 349/111 |
| 5,368,991 A | * | 11/1994 | Uchikawa et al. | 430/288.1 |
| 5,831,701 A | * | 11/1998 | Matsuyama et al. | 349/110 |
| 6,124,910 A | * | 9/2000 | Nishida et al. | 349/110 |
| 2001/0046003 A1 | * | 11/2001 | Song | 349/43 |

FOREIGN PATENT DOCUMENTS

| | | |
|---|---|---|
| JP | 8-254712 | 10/1996 |
| JP | 2000-010107 | 1/2000 |
| JP | 2001-337349 A | 12/2001 |

OTHER PUBLICATIONS

M. Oh-E et al., "S23-1 Principles and Characteristics of Electro-Optical Behaviour with In-Plane Switching Mode", Asia Display '95, pp. 577-580 (cited in specification).
Korean Office Action, with English-language Translation, dated Nov. 23, 2006.

* cited by examiner

*Primary Examiner*—David C. Nelms
*Assistant Examiner*—John Heyman
(74) *Attorney, Agent, or Firm*—Buchanan Ingersoll & Rooney PC

(57) ABSTRACT

A liquid crystal device includes a first substrate, a second substrate arranged oppositely to the first substrate, and a liquid crystal layer sandwiched between the first and second substrates. Preferably, the first substrate includes a gate wiring, a gate terminal part formed at an end of the first substrate and provided with a gate terminal to which a signal to the gate wiring is inputted, a source wiring intersecting with the gate wiring through an insulating film, a switching element connected to the source wiring, a pixel electrode connected to the source wiring through the switching element, and a common electrode arranged oppositely to the pixel electrode. Preferably, the second substrate includes a light shielding film formed on the side of the first substrate and arranged at a position corresponding to the gate wiring, and a cutting where the light shielding film is cut in a pixel near the gate terminal part.

11 Claims, 7 Drawing Sheets

LIQUID CRYSTAL DISPLAY DEVICE HAVING UPPER SUBSTRATE LIGHT SHIELD SUPERPOSING GATE AND SOURCE WIRING WITH CUTS NEAR GATE AND SOURCE TERMINAL PARTS

BACKGROUND OF THE INVENTION

1. Field of the Invention

This invention relates to a liquid crystal display device and a method for manufacturing the same, and more particularly to a liquid crystal display device in an in-plane switching system and a method for manufacturing the same.

2. Description of the Related Art

In an active matrix type liquid crystal display device, the in-plane switching system in which the direction of the electric field to be applied to liquid crystal is in parallel to a substrate has been adopted mainly as a technique for obtaining a very wide angular field of view (See JP-A-8-254712). It has been confirmed that this system can practically remove changes in the contrast when the direction of view angle is changed and in inversion of a gradation level (See M. Oh-e et al, "Asia Display" '95, pp. 577-580). FIG. 7 is a plan view of a pixel region of a conventional general in-plane switching liquid crystal display device. In FIG. 7, reference numeral 100 denotes a TFT (Thin-Film-Transistor) array substrate, and 200 a CF (Color Filter) substrate. Reference numeral 1 denotes one of gate wirings which are a plurality of scanning signal lines formed on an insulating substrate, 2 a gate insulating film, 3 one of source wirings, 4 an insulating film formed on each of the source wirings, 5a, 5b common electrodes, and 6 one of pixel electrodes.

In the IPS liquid crystal display device, the pixel electrodes 6 and common electrodes 5 opposite thereto are arranged on the TFT array substrate. By the electric field between the pixel electrode 6 and common electrode 5, the liquid crystal is driven in the direction of the TFT array substrate. In the configuration shown in FIG. 7, a driving voltage is supplied to the pixel electrode 6 through the TFT so that the electric field is generated in a direction in parallel to the gate wiring 1, i.e., perpendicular to the source wiring 3. By the electric field between the pixel electrode 6 and common electrode 5, the light from a backlight unit provided on the rear side of a liquid display panel is selectively transmitted thereby to provide a desired image.

Referring to FIGS. 8A and 8B, an explanation will be given of the problem involved with the IPS liquid crystal display device described above. FIG. 8A is a plan view which schematically shows the structure of the IPS liquid crystal display device. FIG. 8B is a sectional view which shows the structure in the vicinity of the gate terminal part. FIGS. 8A and 8B schematically show the entire configuration of the liquid display panel and a BM (black matrix) arranged thereon. In FIGS. 8A and 8B, reference numeral 10 denotes a liquid display panel, 11 a display region, 12 a frame region, 13 gate terminal part, 14 source terminal part, 15 a BM (black matrix), 17 a sealing member, 100 a TFT array substrate, and 200 a CF (color filter) substrate.

Generally, the active matrix liquid crystal display panel includes the TFT array substrate 100, CF substrate 200, which is smaller than the TFT array substrate 100, and liquid crystal layer 18 sandwiched therebetween. The TFT array substrate 100 and CF substrate 200 are bonded to each other by the sealing member 17. TFTs (Thin Film Transistors) are arranged in a matrix shape on the TFT array substrate 100. As shown in FIG. 7, the TFT which is a switching element is provided for each of the pixels. On the CF substrate 200, a coloring layer (not shown) is formed at a position corresponding to the pixel for which the corresponding TFT is provided.

A collection of the areas where the pixels are formed constitutes a display region 11 and its periphery constitutes a frame region 12. In the frame region 12 of the TFT array substrate 100, the gate terminal part 13 and source terminal part 14 are formed. The gate terminal part 13 and source terminal part 14 are formed at the ends along the sides of the TFT array substrate 100 adjoining each other, respectively. Namely, the gate terminal part 13 is formed at the end along one end of the TFT array substrate 100, and the source terminal part 14 are formed at the end of the side adjoining the one side. Gate driver ICs for supplying scanning signals are connected to the gate terminal part 13, and source driver ICs for supplying display signals are connected to the source terminal part 14. The signal from each driver IC is supplied to the gate wiring or source wiring through the terminal formed on the gate terminal part 13 or source terminal part 14.

Generally, between the CF substrate 200 of the liquid crystal display device and the coloring layer, light shielding films called "BM" (black matrix) of resin is formed. Further, in the IPS liquid crystal display device, since the source wirings provided on an upper layer shield the backlight, apart of the BM can be omitted. In such an IPS liquid crystal display device, as shown in FIGS. 8A and 8B, a line-like light shielding films 15 are formed. These shielding film 15 are formed in a direction in parallel to the gate wirings, i.e. direction perpendicular to the side where the gate terminal part 13 is provided.

In the IPS liquid crystal display device, since the pixel electrodes and common electrodes are formed on the TFT array substrate 100, the CF substrate 200 is provided with no transparent electrode. Therefore, the light shielding films 15 formed on the CF substrate 200 is not electrically shielded, but capacitively coupled with the gate wirings. As a result, when the electric field is applied to the liquid crystal panel, the electric charge distribution of the light shielding films 15 changes. Thus, the electric field between the pixel electrodes and the common electrodes is disturbed. Such a disturbance of the electric field gives rise to crosstalk or after-image, leading to deterioration in the display quality.

Particularly, changes in the gate potential in the gate terminal part 13 when a signal is inputted to the liquid crystal display panel spread to the light shielding films 15 so that the liquid crystal is instantaneously oriented in a direction of the substrate. As a result, the pixels in the vicinity of the gate terminal part 13 temporarily make white display. In the charge distribution in the light shading films 15 which has been disturbed by the changes in the gate potential, since the charges are diffused over the entire panel from the side of the gate terminal part 13, the region of the white display disappears instantaneously. However, if any wire break occurs in the light shielding films 15, only the broken line(s) looses an escape of charges on the side of the gate terminal. This generates an emission line (s), thereby reducing the production yield.

The liquid display device for obviating such an inconvenience has been proposed (See JP-A-2000-10107 (FIG. 4)). In this liquid display device, a slit is provided on the resin BM in the direction in parallel to the side where the signal is extracted. Thus, the liquid display device can prevent the changes in the gate potential in the gate terminal part from spreading to the BM in the display region. Thus, even the BM is broken, it is possible to prevent the occurrence of the emission line.

However, where the slit in the BM is provided, light leakage occurs at the portion where the slit is provided. In order to prevent the light leakage in the slit in the BM, the slit is arranged on a bus line at the potential equal to that at an opposite electrode. Therefore, the width of the bus line is increased by the slit width (e.g. 100 μm). This gives rise to a problem that the parasitic capacitance is increased to deteriorate the display quality. Further, at the slit, the light incident from the side of the display plane is reflected toward the display plane in a metallic pattern of the bus line. As described above, in the conventional IPS liquid crystal display device, it is difficult to keep the BM potential in a suitable status without influencing the display quality so that the afterimage and display unevenness are reduced.

As described above, the conventional IPS liquid crystal display device has presented a problem that it is difficult to keep the BM potential in a suitable status without influencing the display quality so that the afterimage and display unevenness are reduced.

SUMMARY OF THE INVENTION

This invention has been accomplished in view of the problem described above, and provides a liquid crystal display device which can keep the potential of a light shielding film in an appropriate status so that an afterimage and display unevenness are reduced.

The liquid crystal display device according to a first mode of this invention is a liquid crystal display device including a first substrate (e.g. a TFT array substrate 100 in an embodiment of this invention) and a second substrate (e.g. a CF substrate 200 in this embodiment) which are oppositely arranged and a liquid crystal layer (e.g. a liquid crystal layer 18 in the embodiment) sandwiched between the first and the second substrate, wherein the first substrate includes a gate wiring (e.g. a gate wiring 1 in the embodiment), a gate terminal part (e.g. a gate terminal part 13 in the embodiment) formed at an end of the first substrate and provided with a gate terminal to which a signal to be supplied to the gate wiring is inputted, a source wiring intersecting with the gate wiring through an insulating film, a switching element connected to the source wiring, a pixel electrode (e.g. a pixel electrode 6 in the embodiment) connected to the source wiring through the switching element, and a common electrode (e.g. a common electrode 5 in the embodiment) arranged oppositely to the pixel electrode, and the second substrate includes a light shielding film (e.g. a light shielding film 15 in the embodiment) formed on the side of the first substrate and arranged at a position corresponding to the gate wiring, and a cutting (e.g. a cutting 16 in the embodiment) where the light shielding film is cut in a pixel in the vicinity of the gate terminal part. In accordance with this configuration, the potential of the light shielding film can be kept in an appropriate status so that an afterimage and display unevenness can be reduced.

As regards the liquid crystal display device according to the second manner of this invention, in the liquid crystal display device described above, another cutting where the light shielding film is cut is further formed in the vicinity of the end opposite to the gate terminal part. In accordance with this configuration, the potential of the light shielding film can be kept in a more appropriate status so that an afterimage and display unevenness can be reduced.

As regards the liquid crystal display device according to the third manner of this invention, in the liquid crystal display device described above, the cutting is formed in an area remote from an intersection point where the source wiring and the gate wiring intersect each other in which the gate wiring and the pixel electrode are formed in parallel or the gate wiring and the common electrode are formed in parallel. In accordance with this configuration, light leakage at the cutting can be reduced.

The liquid crystal display device according to the fourth manner of this invention is a liquid crystal device including a first and a second substrate which are oppositely arranged and a liquid crystal layer sandwiched between the first and the second substrate, wherein the first substrate includes a gate wiring, a source wiring intersecting with the gate wiring through an insulating film, a source terminal part formed at an end of the first substrate and provided with a source terminal to which a signal to be supplied to the source wiring is inputted, a switching element connected to the source wiring, a pixel electrode connected to the source wiring through the switching element, and a common electrode arranged oppositely to the pixel electrode, and the second substrate includes a light shielding film formed on the side of the first substrate and arranged at a position corresponding to the source wiring, and a cutting where the light shielding film is cut in a pixel in the vicinity of the source terminal part.

As regards the liquid crystal display device according to the fifth manner of this invention, in the liquid crystal display device as described above, another cutting where the light shielding film is cut is further formed in the vicinity of the end opposite to the source terminal part. In this configuration, the potential of the light shielding film can be kept in a more appropriate status so that an afterimage and display unevenness can be reduced.

As regards the liquid crystal display device according to the sixth manner of this invention, in the liquid crystal display device described above, the cutting is formed in an outermost pixel in a display region. In accordance with this configuration, in a nearly entire display region, the potential of the light shielding film can be kept in an appropriate status so that an afterimage and display unevenness can be reduced.

As regards the liquid crystal display device according to the seventh manner of this invention, in the liquid crystal display described above, the cutting is formed in each of almost all pixels in a display region. In accordance with this configuration, the potential of the light shielding film can be kept in a more appropriate status so that an afterimage and display unevenness can be reduced.

As regards the liquid crystal display device according to the eighth manner of this invention, in the liquid crystal display device described above, the light shielding film is made of photosensitive resin, and the cutting is formed by exposing the photosensitive to light and developing it. Thus, the cutting can be formed through a simple step.

In accordance with this invention, there is provided a display device and its manufacturing method which can easily repair a wire break.

DETAILED DESCRIPTION OF THE INVENTION

Figure 1A:
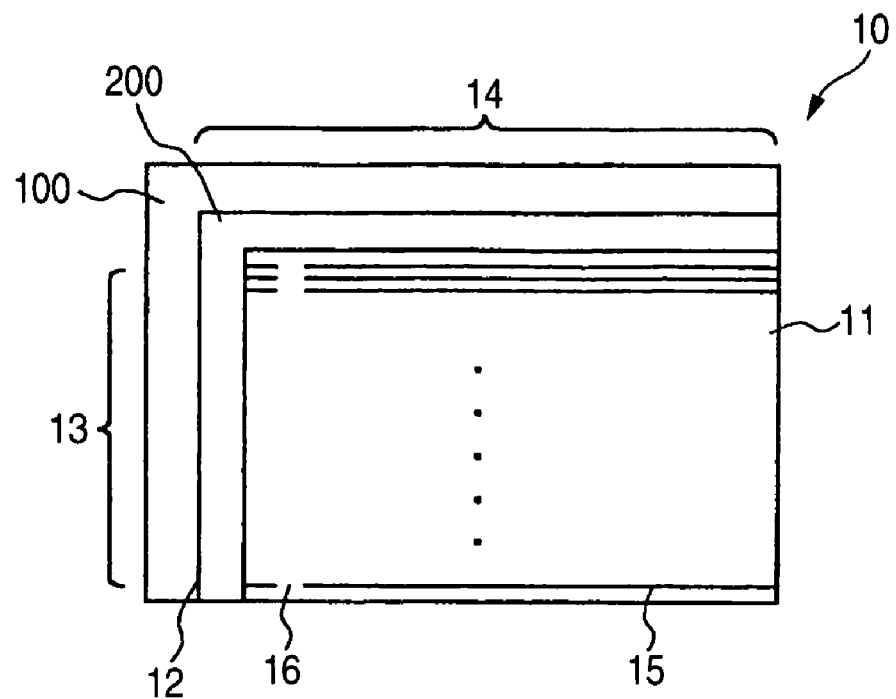
FIGS. 1A and 1B are views showing the configuration of a liquid crystal panel in a liquid crystal display device according to this invention.

An explanation will be given of a mode to which this invention can be applied. The following explanation is directed to an exemplary embodiment of this invention. The mode for carrying out this invention should not be limited to this embodiment. For brevity of the explanation, in the following description, omission or simplification will be made appropriately. Further, without departing from the scope of this invention, those skilled in the art can make a change, addition or conversion for each of elements in the following embodiment. Incidentally, in each of the attached drawings, like reference numerals refer to like elements, and so the explanation will be omitted appropriately.

Figure 1B:
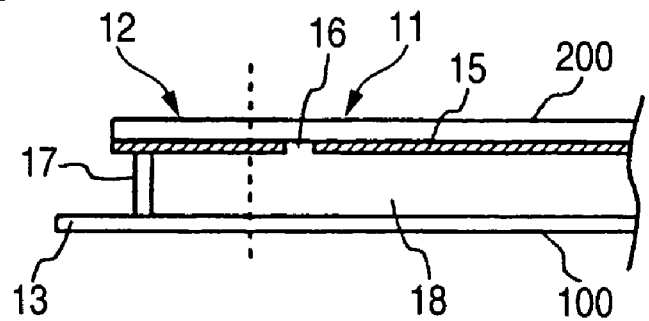

Now referring to FIGS. 1A and 1B, an explanation will be given of the liquid crystal display device according to an embodiment of this invention. FIG. 1A is a plan view which schematically shows the structure of the liquid crystal display device according to this embodiment. FIG. 1B is a sectional view which shows the structure in the vicinity of the gate terminal part. In FIGS. 1A and 1B, reference numeral 10 denotes a liquid display panel, 11 a display region, 12 a frame region, 13 a gate terminal part, 14 a source terminal part, 15 a light shielding film, 16 a cutting, 17 a sealing member, 18 a liquid crystal layer, 100 a TFT array substrate, and 200 a CF (color filter) substrate. FIGS. 1A and 1B schematically show the entire configuration of the liquid display panel 10 and light shielding films 15 arranged thereon. Also, in FIG. 1A, the light shielding film 15 is illustrated within only the display region in order to define the explanation thereof.

In this embodiment, an explanation will be given of an active matrix type IPS liquid display device. The active matrix liquid crystal display panel includes the TFT array substrate 100, CF substrate 200, which is smaller than the TFT array substrate 100, and liquid crystal layer 18 sandwiched therebetween. The TFT array substrate 100 and CF substrate 200 are bonded to each other by the sealing member 17. In the active matrix type liquid crystal device, TFTs (Thin Film Transistors) are arranged in a matrix shape on the TFT array substrate 100. The TFT which is a switching element is provided for each of the pixels. On the CF substrate 200, a coloring layer (not shown) is formed at a position corresponding to the pixel opening on the side of the TFT substrate 100.

The region where the pixels are formed constitutes a display region 11 and its periphery constitutes a frame region 12 which is a non-display region. The sealing member 17 is provided in the frame region 12 so as to surround the display region 11. In the frame region 12 of the TFT array substrate 100, the gate terminal part 13 and source terminal part 14 are formed. The gate terminal part 13 and source terminal part 14 are formed at the ends along the sides of the TFT array substrate 100 adjoining each other, respectively. Namely, the gate terminal part 13 is formed at the end along one end of the TFT array substrate 100, and the source terminal part 14 is formed at the end of the side adjoining the one side.

In the gate terminal part 13, gate terminals, through which signals are supplied to the corresponding gate wirings from gate driver ICs (not shown), are formed. Further, in the source terminal part 14, source terminals, through which signals are supplied to the corresponding source wirings from source driver ICs (not shown), are formed. The gate driver ICs for supplying scanning signals are connected to the gate terminal part 13, and the source driver ICs for supplying display signals are connected to the source terminal part 14. The signal from each driver IC is supplied to the gate wiring or source wiring through each of the terminals formed in the gate terminal part 13 or source terminal part 14. Each driver IC is connected to each terminal of the TFT array substrate 100 through e.g. TCP (Tape Carrier Package). Otherwise, in the case of a COG (Chip-On-Glass) type liquid crystal display device, each driver IC is directly connected to each terminal through e.g. ACF (Anisotropic Conductive Film).

A plurality of gate wirings (not shown) are provided in a direction perpendicular to the side where the gate terminal part 13 are provided. A plurality of source wirings (not shown) are provided in a direction in parallel to the side where the gate terminal part 13 are provided. The gate wirings and the source wirings are arranged to intersect through a gate insulating film. The constitution is described below. At the side of the TFT array substrate of the CF substrate 200, a plurality of line-like Light shielding films 15 are formed within the display region 11 in a direction perpendicular to the side where the gate terminal part 13 are provided. The light shielding films 15 and the gate wirings are arranged at opposite positions through the liquid crystal layer.

On the side of the gate terminal part 13 of the CF substrate 200, light shielding films (not shown) for preventing light leakage are formed on the entire frame region. Like the light shielding films 15 in the display region, these light shielding films in the frame region 12 are also arranged on the side of the TFT substrate 100. The light shielding films in the frame region 12 prevent the reflecting light by the metallic pattern of the gate wirings or bus lines formed in the frame region and shield the light leakage from the backlight from the gaps between the wirings. Thus, the display unevenness can be reduced.

Light polarizing plates (not shown) are arranged above and below these two substrates. In the transmitting type liquid crystal display device, a backlight is placed behind the display device. "Orientation processing" is made for the surface of each of these substrates provided with the electrodes so that the liquid crystal with a desired director which represents the average of the signs of liquid crystal molecules has birefringence. The light incident from the polarizing plate on the one side from the backlight is changed, by birefringence, into elliptically-polarized light which is incident on the polarizing plate on the opposite side. In this state, when a voltage is applied between the upper and lower electrodes, the orientation status in the director is changed to vary the birefringent coefficient of the liquid crystal layer. As a result, the elliptically-polarized light status incident on the polarizing plate on the opposite side changes. This provides an electro-optical effect of changing the intensity and spectrum of the light passing through the liquid crystal display device.

In this embodiment, in order to keep the potential of the light shielding films 15 in an appropriate status so that the afterimage and display unevenness are reduced, cuttings 16 are made in the light shielding films 15. These cuttings 16 are arranged at predetermined positions of the pixels on the side of the gate terminal part 13 within the display region 11. The cuttings 16 are provided for the respective line-like light shielding films 15.

Figure 2:
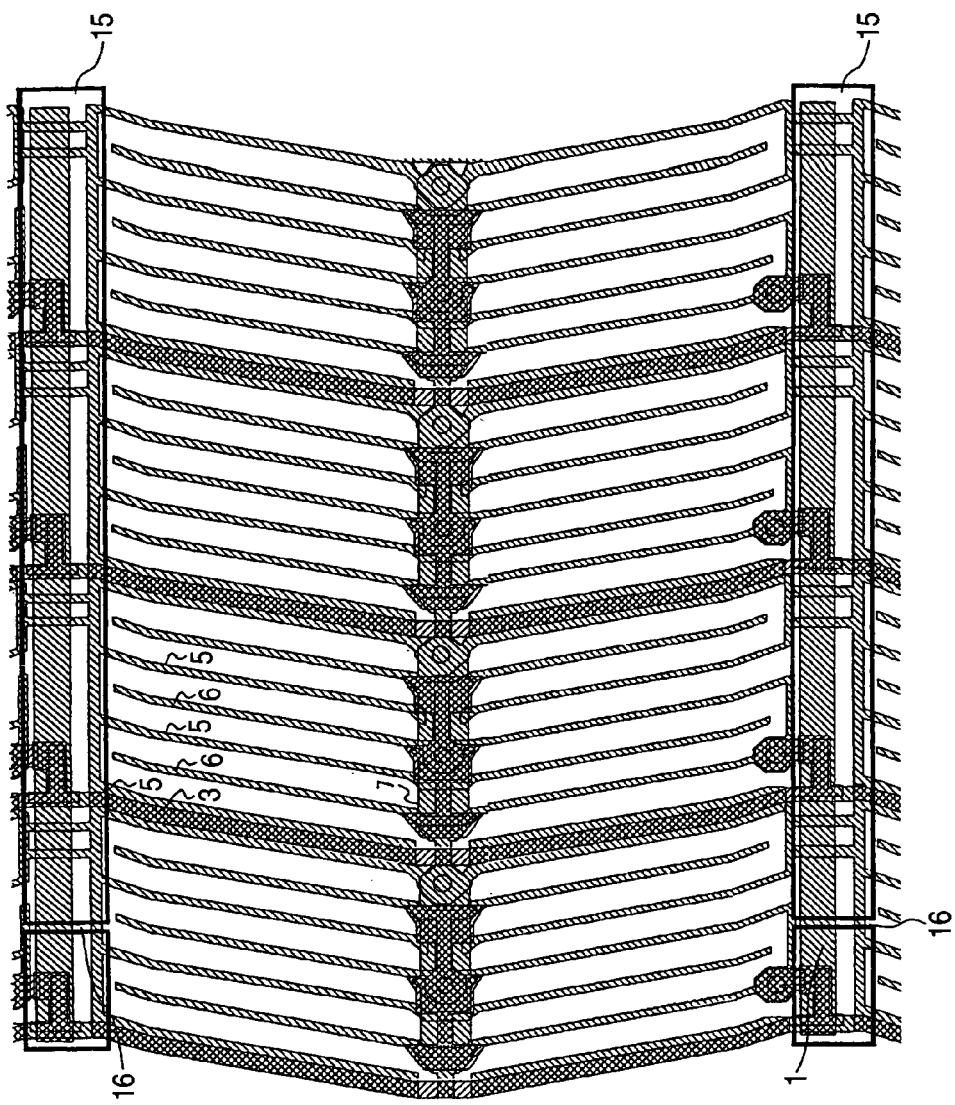
FIG. 2 is a plan view of the pixel portion of the TFT array in the liquid crystal display device according to this invention.

Referring to FIG. 2, an arrangement of the cuttings 16 will be explained. FIG. 2 is a plan view of the configuration of the pixel part of the TFT array substrate 100. In FIG. 2, the light shielding films 15 formed on the CF substrate 200 are superposed for illustration.

In FIG. 2, reference numeral 3 denotes a source wiring which extends in a direction perpendicular to the direction of the electric field generated between a common electrode 5 described later and the pixel electrode 6 at the end of each pixel. The source wiring 3 has a thickness of e.g. 400 nm to 500 nm. Reference numeral 5 denotes the common electrode which is comb-shaped, consisting of a plurality of electrodes (fingers) arranged in parallel and alternately to a plurality of electrodes (fingers) of a pixel electrode 6 described later. The common electrode 5 is also called an opposite electrode. The common electrode 5 has a thickness of e.g. 100 nm. Reference numeral 6 denotes a comb-like pixel electrode consisting of a plurality of electrodes connected to thin film transistors (TFTs) and provided in parallel with the source wiring. The pixel electrode 6 is formed of a transparent conductive film of metal such as Cr or ITO (Indium Tin Oxide). Reference numeral 7 denotes a common capacitor wiring connected to the common electrode 5 through a through-hole. In the example shown in FIG. 2, the source wirings 3, common electrodes 5 and pixel electrodes 6 are bent once in their central portions. The bending points are provided on the common capacitor wiring 7. In accordance with such an electrode configuration with the bending points, two driving directions of the liquid crystal can be obtained, thereby preventing the deterioration in the view angle characteristic which occurs in a specific direction of the IPS liquid crystal panel.

As shown in FIG. 2, the source wiring 3 and common electrode 5, which are arranged between the pixels adjacent in a lateral direction or the direction of a generated electric field, overlap with each other. In other words, the common electrode 5 is superposed on the source wiring 3 so that the former wraps the latter through an insulating film 4 and an organic flattening film 9.

The gate wirings 1 are provided to intersect the source wirings 3 through the gate insulating film. The gate wirings 1 and source wirings 3 intersect at approximately right angles. The gate wirings 1 are formed beneath the source wirings 3. In the vicinity of the intersecting points of the gate wirings 1 and the source wirings 3, the TFTs which are switching elements are arranged. Thus, the pixels to which a display signal is to be supplied can be selected.

The CF substrate 200 has line-like light shielding films 15 formed at the positions opposite to the gate wirings 1. The light shielding films 15 are arranged in a direction in parallel to the gate wirings 1 so that the former is superposed on the latter. In FIG. 2, the light shielding films 15 are illustrated in bold lines. The width of the light shielding film 15 is greater than that of the gate wiring 1 so that the former covers the latter. In the vicinity of the gate wiring 1, a part of the light shielding film 15 overlaps with an area of the pixel electrode 6 in parallel to the gate wiring 1. Further, in the vicinity of the gate wiring 1, a part of the light shielding film 15 also overlaps with an area of the common electrode 5 in parallel to the gate wiring 1.

As seen from FIG. 2, the light shielding films 15 each has a cutting 16 formed within the pixel at the left end. In this embodiment, an outermost pixel on the side of the gate terminal part 13 is specified as the pixel at the left end. The cutting 16 of the light shielding film 15 is formed within this outermost pixel. Namely, the pixel with the cutting 16 is the pixel nearest to the gate terminal part 13. Thus, the potential in the light shielding films 15 can be kept in an appropriate status within the display region so that generation of the afterimage and display unevenness can be prevented over all the pixels. It is preferable that the cutting 16 is made in the pixel near the gate terminal part 13, and more preferable that the cutting 16 is made in the pixel nearest to the gate terminal part 13. The configuration described above can prevent the changes in the gate potential when the signal is supplied from the driver IC from spreading to the light shielding film 15 located on the side of the display region with respect to the cutting 16, thereby preventing the potential of the light shielding film 15 from being disturbed. Further, even where a wire break of the shielding film 15 has occurred in the display region 13, because of provision of the cutting 16, electric charges in the light shielding film 15 from the side of the gate terminal part are prevented from being moved. In this case, since the charges do not move to the side of the display region with respect to the cutting 16, it is possible to prevent occurrence of emission lines. This improves the production yield of the liquid crystal display device.

Figure 3:
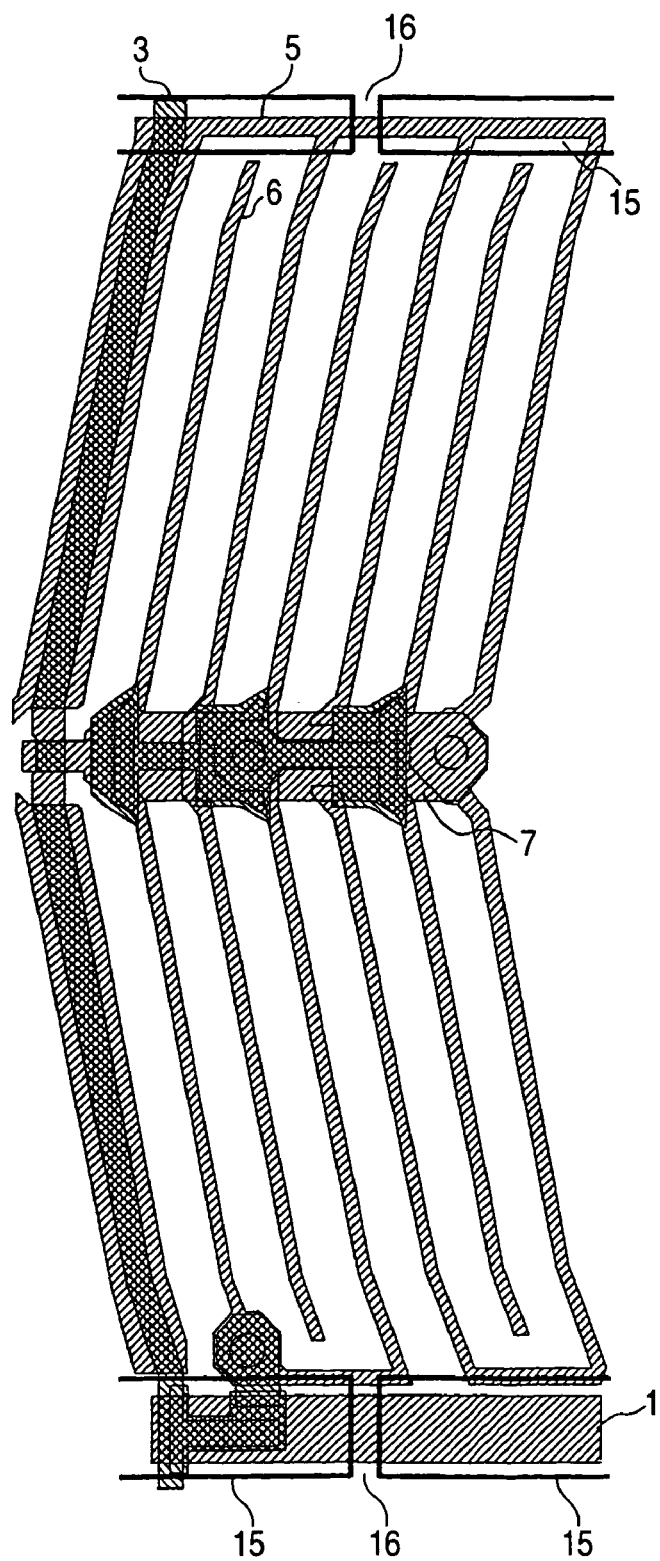
FIG. 3 is a plan view of the pixel portion of the TFT array in the liquid crystal display device according to this invention.

Referring to FIG. 3, the outermost pixel where the cutting 16 is formed will be explained. FIG. 3 is an enlarged plan view of the configuration of the pixel where the cutting 16 is formed. In order to reduce the display unevenness, the cutting 16 is preferably formed at a position where light leakage is not generated. For example, in the gate wiring 1, if the cutting 16 is provided at the position corresponding to the area where the pixel electrode 6 or common electrode 5 is formed obliquely or perpendicularly to the gate wiring 1, the light leakage occurs through this cutting 16. Concretely, such a position is included in the area in the vicinity of the TFT. In this area, since the electric field inclined from the prescribed direction in which the liquid crystal is oriented is formed, the light leakage is likely to occur. For this reason, it is desirable that the cutting 16 is formed at the area other than the above area.

Concretely, it is desirable that the cutting 16 of the light shielding film 15 is formed at the position corresponding to the area where the pixel electrode 6 or common electrode 5 is formed in parallel to the gate wiring 1. By providing the cuttings 16 in the arrangement as shown in FIG. 3, it is possible to prevent occurrence of the light leakage due to orientation abnormality of the liquid crystal.

The cuttings 16 are formed in the light shielding films 15 which are arranged oppositely to the plurality of gate wirings 1, respectively. Therefore, the cuttings 16 are formed virtually in a line for a raw of the outermost pixels on the side of the gate terminal part 13. The width of each of the cuttings 16 formed in the respective pixels is 10 to 30 μm. In accordance with this arrangement, the area of the metallic pattern viewed from the side of the display plane can be made smaller than in the case where slit is provided on the BM (black matrix) other than the display region 13. Specifically, since the total area of the cuttings 16 formed for the plurality of pixels is smaller than the area of the opening of the slit, the metallic pattern on the background side of the cuttings 15 is difficult to be visually viewed from the display planeside. Thus, it is possible to reduce the display unevenness due to the reflection of light from the display plane side by the metallic pattern. Further, in accordance with this configuration, since it is not necessary to increase the width of the bus line corresponding to that of the slit pattern, the width of the bus line can be decreased. Thus, since the parasitic capacitance can be decreased, the influence on the display quality can be reduced. As described above, by forming the cutting 16 within each of the pixels in the display region, the potential of the light shielding films can be kept in an appropriate status. Accordingly, the afterimage, display unevenness, occurrence of emission lines, etc. can be suppressed so that the liquid crystal display device with improved display quality can be provided.

Now referring to FIGS. 4A to 4E, an explanation will be given of a process for manufacturing a TFT array substrate 100. First, as seen from FIG. 4A, a conductive film with light permeability or a multiplayer of these conductive films is deposited on an insulating substrate by the technique such as sputtering and vapor deposition. In this case, the conductive film is made of Cr, Al, Ti, Ta, Mo, W, Ni, Cu, Au, Ag, an alloy having a main component of one of these elements, ITO (Indium Tin Oxide), etc. Further, by photolithography/processing, gate wirings 1, gate electrodes, common capacitor wirings are formed. Next, as seen from FIG. 4B, a gate insulating film 2 of e.g. silicon nitride, a semiconductor film 93 of amorphous silicon or poly-Si and a contact film of n+amorphous Si or n+ poly-Si highly doped with impurities of P (phosphorus) in the case of an n-type TFT are successively deposited by e.g. plasma CVD, normal pressure CVD or reduced pressure CVD. In addition, the contact film and semiconductor film 93 are processed to form islands.

Figure 4A:
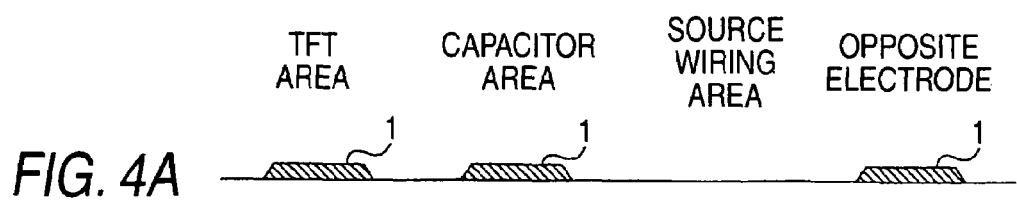
FIG. 4A, FIG. 4B, FIG. 4C, FIG. 4D and FIG. 4E are flowcharts showing the process for manufacturing a TFT array substrate according to this invention.
Figure 4B:
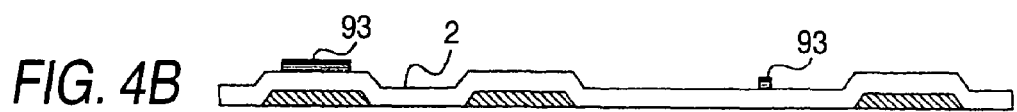
Figure 4C:
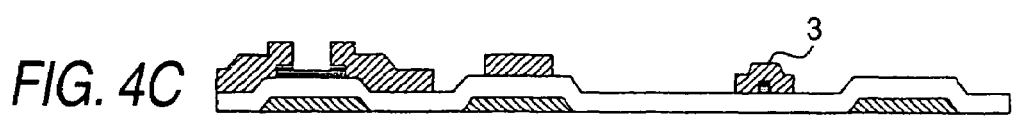

As seen from FIG. 4C, another conductive film with light permeability or a multiplayer of these conductive films is deposited on an insulating substrate by the technique such as sputtering and vapor deposition. In this case, the conductive film is made of Cr, Al, Ti, Ta, Mo, W, Ni, Cu, Au, Ag, an alloy having a main component of one of these elements, ITO (Indium Tin Oxide), etc. Thereafter, by photolithography/processing and micromachining, source wirings 3, source electrodes, drain capacitor wirings and holding capacitor electrodes are formed. Further, using, as a mask, the source electrode and drain electrode or the photoresist employed when they are formed, the contact film is etched so that it is removed from the channel region.

Figure 4D:
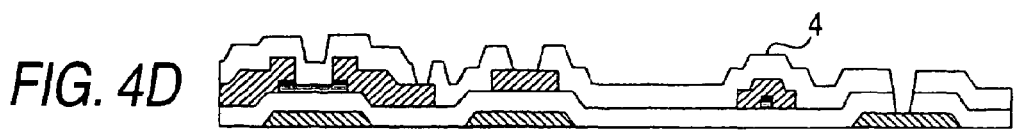

Next, as seen from FIG. 4D, an insulating film 4 of silicon nitride, silicon oxide, inorganic insulator or organic resin is deposited. The insulating film 4 is deposited twice or more to form a first insulating film and a second insulating film. Thereafter, by photolithography and subsequent etching, contact holes are made.

Figure 4E:

Finally, as seen from FIG. 4E, still another conductive film with light permeability or a multiplayer of these conductive films is deposited on an insulating substrate (In this case, the conductive film is made of Cr, Al, Ti, Ta, Mo, W, Ni, Cu, Au, Ag, an alloy having a main component of one of these elements, ITO (Indium Tin Oxide), etc.) and patterned to form pixel electrodes 6 and common electrodes 5. Thus, the TFT array substrate 100 having the arrangement as shown in FIGS. 2 and 3 is formed. Further, an orientation film of e.g. polyimide is formed from above and rubbed in a prescribed direction.

Figure 5A:
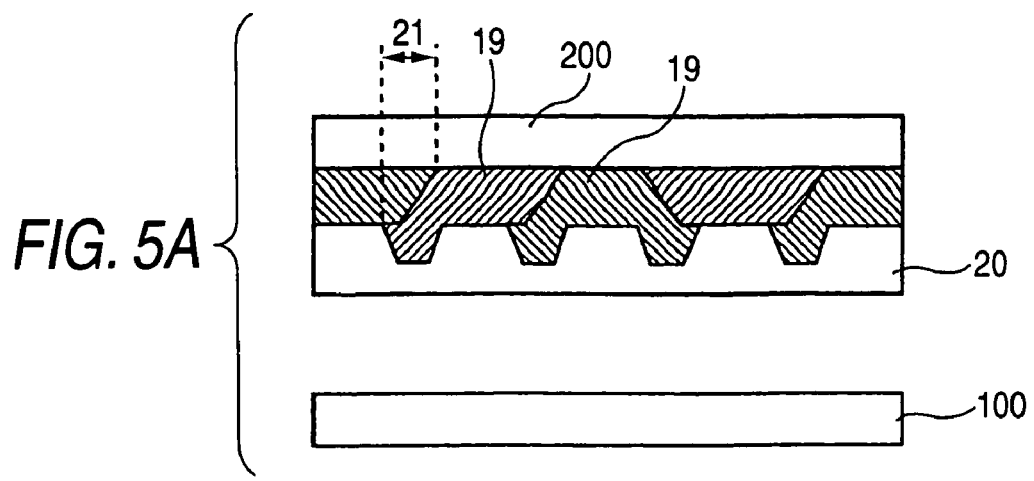
FIGS. 5A and 5B are views showing the arrangement of the pixel portion of the CF substrate in the liquid crystal display device according to this invention.
Figure 5B:
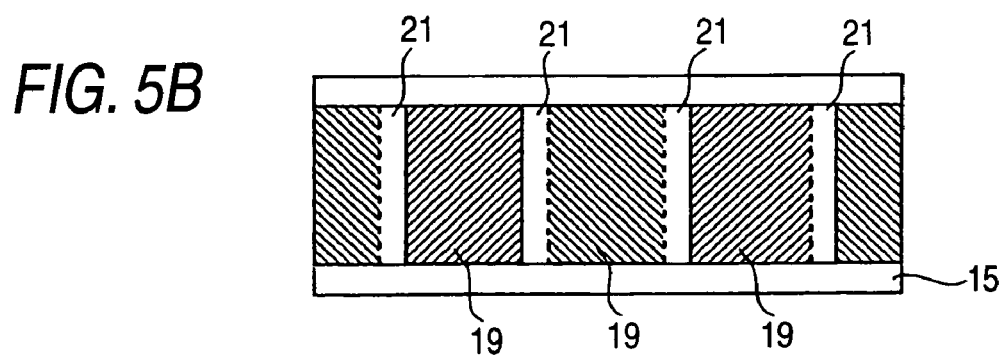
Figure 6:
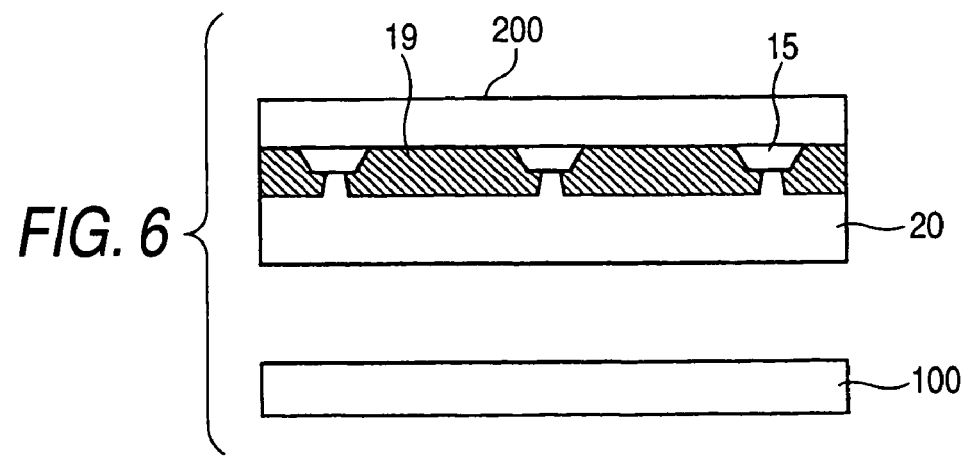
FIG. 6 is a view showing the arrangement of the pixel portion of the CF substrate in the liquid crystal display device according to this invention.
Figure 7:
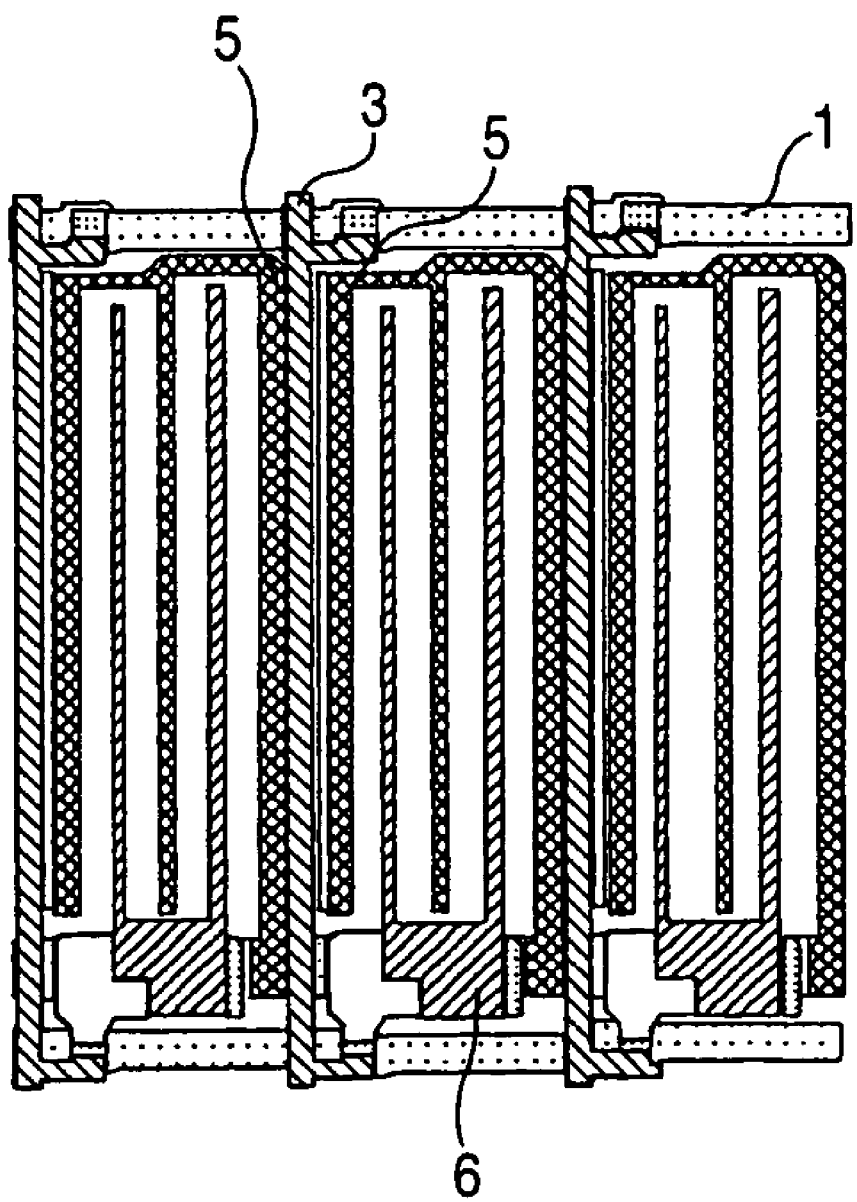
FIG. 7 is a view showing the pixel portion of the TFT array in a conventional liquid crystal display device.
Figure 8A:
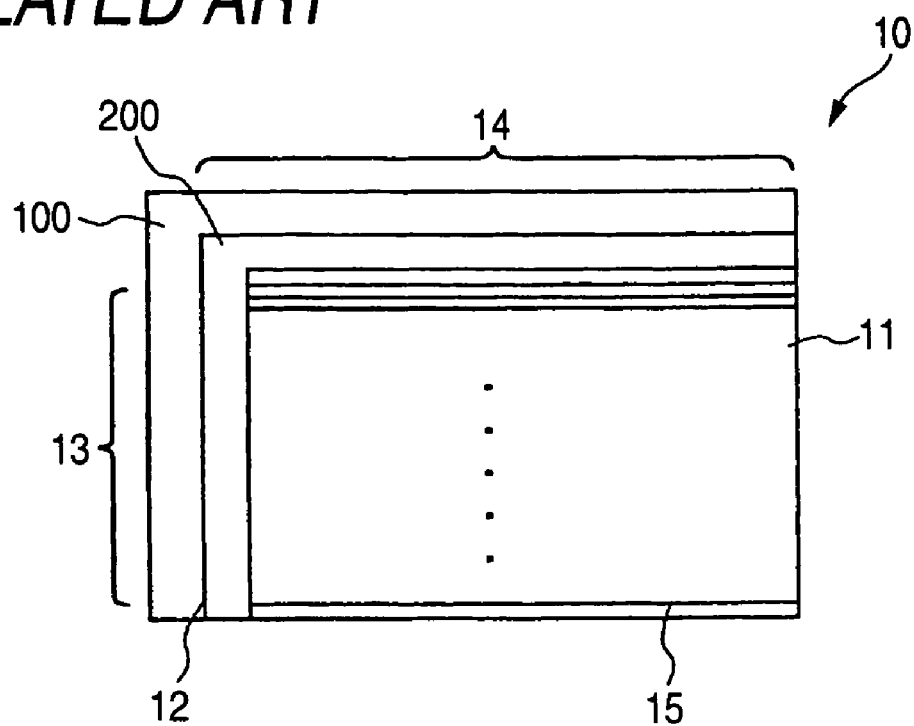
FIGS. 8A and 8B are views showing the structure of the liquid crystal panel in a conventional liquid crystal display device.
Figure 8B:
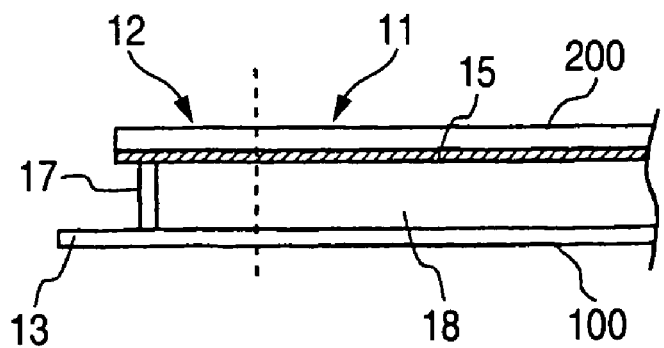

Referring to FIGS. 5A, 5B and 6, an explanation will be given of the arrangement of the CF substrate 200. FIG. 5A is a sectional view of the arrangement of the CF substrate 200 in which the areas between the light shielding films 15 are taken in a direction in parallel to the light shielding films. FIG. 5B is a plan view of the arrangement of the CF substrate 200. FIG. 6 is a sectional view of the arrangement of the CF substrate 200 taken in a direction perpendicular to the light shielding films 15. In FIG. 6, reference numeral 19 denotes a coloring layer, 20 an overcoat film, and 21 an overlapping portion where the adjacent coloring layers overlap with each other.

As seen from FIGS. 5A and 5B, the CF substrate 200 includes respective coloring layers 19 of R, G and B and light shielding films 15 arranged between these coloring layers 19. The light shielding films 15 are arranged in a direction in parallel to the gate wirings 1 at the positions corresponding thereto. The overcoat film 20 is formed on each of the coloring layers 19. In this embodiment, the light shielding films 15 are provided in only the direction in parallel to the gate wirings 1, and not provided in a direction in parallel to the source wirings 3. As shown in FIGS. 5A and 5B, therefore, the coloring layers 19 are caused to overlap with each other at the positions corresponding to the pixels adjacent to each other in each of the light shielding films 15, thereby forming the overlapping portions 21. These overlapping portions 21 are arranged at the positions corresponding to the source wirings 3.

An explanation will be given of the process for manufacturing the CF substrate 200. First, in order to form the light shielding films 15 serving as the BM, a photosensitive black resin is applied on a transparent insulating substrate. The light shielding films 15 are made of negative-type acryl resin with carbon dispersed therein. The photosensitive acryl resin is patterned by photolithography. For example, the acryl resin is applied to the insulating substrate by e.g. spin coating. The acryl resin thus applied is exposed to light and developed using an alkaline developing solution. Thus, the light shielding films 15 are formed at the positions corresponding to the gate wirings 1, respectively. Further, the cuttings 16 are formed in the light shielding film 15 at predetermined positions in the outermost pixels.

From above, the pigment of R is applied to the substrate. Thereafter, the pigment is patterned through the steps of resist application, light exposure and development, thereby forming the coloring layer 19 of R between the light shielding films 15. These steps are repeatedly performed for the coloring layer of G and the coloring layer of B, thus forming the coloring layers 19 for three primary colors. In this step, in order to prevent light leakage, the coloring layer 19 is caused to overlap with the light shielding film 15. In addition, as seen from FIGS. 5A and 5B, the respective coloring layers 19 are caused to overlap with each other, thereby forming the overlapping portions 21. In this embodiment, the coloring layers 19 were formed using the pigments. However, the coloring layers can be formed by any one of the techniques of dying, electro-deposition and printing. The order of forming the coloring layers of R, G and B may be changed.

The transparent overcoat film 20 is applied from above to flatten the surface. Further, an orienting film (not shown) is deposited on the surface. Thereafter, the orienting film is subjected to baking and rubbing processing, like the orienting film of the TFT substrate 100. In this case, the rubbing processing is performed in a direction in nearly parallel to the source wirings 3. Thus, if the TFT is in an OFF status, the liquid crystal molecules are oriented in the direction in nearly parallel to the source wirings 3. The overcoat film 20, which has heat resistance and chemical resistance, serves to protect the coloring layers 19. The overcoat film and orienting film may be formed with the same film or different films.

A spacer for giving a gap in which a liquid crystal material is injected is formed between the TFT substrate 100 and the CF substrate 200 equipped with the corresponding orienting films. The TFT substrate 100 and the CF substrate 200 are bonded to each other by a sealing material in their aligned state, and the liquid crystal material is injected into the gap. Further, the gate driver ICs are connected to the gate terminals formed in the gate terminal part 13. Likewise, the source driver ICs are connected to the source terminals formed in the source terminal part 14. Through the steps as described above, the liquid crystal display panel 10 is manufactured. A backlight unit is attached to the rear side of the liquid crystal display panel 10 and fixed using a frame, thus completing the liquid crystal display device.

In the explanation hitherto made, the light shielding films 15 were illustrated to have a fixed width in parallel to the gate wirings 1. However, the light shielding films 15 may be formed to have different widths according to light leakage areas. For example, in the vicinity of the TFTs, at the intersection portions of gate wirings 1 and source wirings 3 and in the areas where the gate wiring 1, pixel electrodes 6 and common electrodes are near one another, the light shielding films 15 each having a wider width may be provided in order to prevent the light leakage due to the disorder of the electric field.

In the embodiment described above, the cuttings 16 were provided in only the outermost pixels. However, the cuttings 16 may be provided at any position as long as it is in the vicinity of the gate terminal part 13. Further, in addition to the vicinity of the gate terminal part 13, the cuttings 16 may be provided in the pixels at the end opposite to the gate terminal part 13 at the positions as shown in FIG. 3. Further, the cuttings 16 may be provided in the respective pixels formed in a matrix shape at the positions as shown in FIG. 3. Furthermore, where the light shielding films 15 are formed at the positions opposite to the source wirings 3, the cuttings 16 may be formed in the pixels in the vicinity of the source terminal part 14 in the same manner as in the gate terminal part.

What is claimed is:

1. A liquid crystal device comprising:
    a first substrate;
    a second substrate which is arranged oppositely to the first substrate; and
    a liquid crystal layer sandwiched between the first substrate and the second substrate,
    wherein the first substrate includes:
        a gate wiring;
        a gate terminal part formed at an end of the first substrate and provided with a gate terminal to which a signal to be supplied to the gate wiring is inputted;
        a source wiring intersecting with the gate wiring through an insulating film; a switching element connected to the source wiring;
        a pixel electrode connected to the source wiring through the switching element; and
        a common electrode arranged oppositely to the pixel electrode, and
    wherein the second substrate includes:
        a light shielding film formed on the side of the second substrate nearest the first substrate, said light shielding film having a substantially continuous line-like shape arranged at a position superposed on the gate wiring; and
        a cutting where the light shielding film is cut in a pixel in a vicinity of the gate terminal part.

2. The liquid crystal display device according to claim 1, wherein another cutting where the light shielding film is cut is further formed in a vicinity of an end opposite to the gate terminal part.

3. The liquid crystal display device according to claim 1, wherein the cutting is formed in an area remote from an intersection point where the source wiring and the gate wiring intersect each other, and in which the gate wiring and the pixel electrode are formed in parallel or the gate wiring and the common electrode are formed in parallel.

4. A liquid crystal device comprising:
    a first substrate; a second substrate which is arranged oppositely to the first substrate; and
    a liquid crystal layer sandwiched between the first substrate and the second substrate, wherein the first substrate includes:
        a gate wiring;
        a source wiring intersecting with the gate wiring through an insulating film;
        a source terminal part formed at an end of the first substrate and provided with a source terminal to which a signal to be supplied to the source wiring is inputted; a switching element connected to the source wiring;
        a pixel electrode connected to the source wiring through the switching element; and a common electrode arranged oppositely to the pixel electrode,
    wherein the second substrate includes:
        a light shielding film formed on the side of the second substrate nearest the first substrate, said light shielding film having a substantially continuous line-like shape arranged at a position superposed on the source wiring; and
        a cutting where the light shielding film is cut in a pixel in a vicinity of the source terminal part.

5. The liquid crystal display device according to claim 4, wherein another cutting where the light shielding film is cut is further formed in a vicinity of an end opposite to the source terminal part.

6. The liquid crystal display device according to claim 1, wherein the cutting is formed in an outermost pixel in a display region.

7. The liquid crystal display device according to claim 4, wherein the cutting is formed in an outermost pixel in a display region.

8. The liquid crystal display device according to claim 1, wherein the cutting is formed in each of substantially all pixels.

9. The liquid crystal display device according to claim 4, wherein the cutting is formed in each of substantially all pixels.

10. The liquid crystal display device according to claim 1, wherein the light shielding film is made of photosensitive resin, and the cutting is formed by exposing the photosensitive resin to light and developing it.

11. The liquid crystal display device according to claim 4, wherein the light shielding film is made of photosensitive resin, and the cutting is formed by exposing the photosensitive resin to light and developing it.

* * * * *